United States Patent
Dai et al.

(10) Patent No.: US 9,966,858 B2
(45) Date of Patent: May 8, 2018

(54) DC-DC CONVERTING APPARATUS FOR OBTAINING A CONSTANT OUTPUT VOLTAGE

(71) Applicant: Murata Manufacturing Co., Ltd., Nagaokakyo-shi, Kyoto-fu (JP)

(72) Inventors: Jiale Dai, Shanghai (CN); Yu Cao, Shanghai (CN); Kezhi Wang, Shanghai (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days. days.

(21) Appl. No.: 15/279,701

(22) Filed: Sep. 29, 2016

(65) Prior Publication Data
US 2017/0093293 A1    Mar. 30, 2017

(30) Foreign Application Priority Data

Sep. 30, 2015 (CN) .......................... 2015 1 0640567
Aug. 17, 2016 (CN) .......................... 2016 1 0679662

(51) Int. Cl.
H02M 3/335 (2006.01)
H02M 1/32 (2007.01)

(52) U.S. Cl.
CPC ......... *H02M 3/33507* (2013.01); *H02M 1/32* (2013.01)

(58) Field of Classification Search
CPC ... H02M 2001/007; H02M 2001/0083; H02M 2001/0096; H02M 3/335; H02M 2001/45; H02M 3/1584; H02M 3/28; H02J 1/102
See application file for complete search history.

(56) References Cited

U.S. PATENT DOCUMENTS

| | | | | |
|---|---|---|---|---|
| 5,083,078 A | * | 1/1992 | Kubler | .................... G05F 1/595 |
| | | | | 323/268 |
| 7,184,280 B2 | * | 2/2007 | Sun | .................... H02M 3/33592 |
| | | | | 363/127 |
| 2013/0336017 A1 | | 12/2013 | Uno et al. | |

FOREIGN PATENT DOCUMENTS

| | | |
|---|---|---|
| CN | 101647181 A | 2/2010 |
| CN | 103516196 A | 1/2014 |
| JP | 11-187662 A | 7/1999 |
| JP | 2003-111393 A | 4/2003 |
| JP | 2013-258860 A | 12/2013 |

OTHER PUBLICATIONS

Official Communication issued in corresponding Japanese Patent Application No. 2016-191321, dated Aug. 29, 2017.

* cited by examiner

*Primary Examiner* — Gary L Laxton
(74) *Attorney, Agent, or Firm* — Keating & Bennett, LLP

(57) ABSTRACT

A DC-DC converting apparatus for obtaining a constant output voltage includes a DC voltage source that outputs a DC power voltage, a main circuit that converts an input voltage into an output voltage having a set value, an auxiliary circuit, coupled to the DC voltage source, that couples to the main circuit when the input voltage has a fluctuation exceeding a predetermined range so that an output voltage is maintained at the output voltage having the set value.

31 Claims, 6 Drawing Sheets

DC-DC CONVERTING APPARATUS FOR OBTAINING A CONSTANT OUTPUT VOLTAGE

CROSS REFERENCE TO RELATED APPLICATIONS

This application claims the benefit of priority to Chinese Patent Application Nos. 201510640567.X filed Sep. 30, 2015 and 201610679662.5 filed Aug. 17, 2016. The entire contents of each of these applications are hereby incorporated herein by reference.

BACKGROUND OF THE INVENTION

1. Field of the Invention

The present invention relates to a DC-DC converting apparatus, and particularly, to an improved DC-DC converting apparatus for obtaining a constant output voltage via an auxiliary circuit.

2. Description of the Related Art

A DC-DC converting apparatus is a voltage converter for effectively converting a DC input voltage into a constant DC output voltage, and examples of the converter include a bridge circuit, Bulk, Boost and other circuit elements. That is, a desired constant output voltage is obtained via a conversion from a large unsteady input DC or AC power source through the use of such voltage converting circuits.

In operation, an unsteady input DC power source has an input voltage value which tends to fluctuate, and the smaller that the fluctuation range is, the higher that the efficiency of the voltage converting circuit is (i.e., the lower the loss of the circuit is). Therefore, in order to obtain a highly efficient converting circuit, the gain range must be small.

However, if a voltage of an input power source has a large fluctuation range, a highly efficient converting circuit cannot be directly used because existing highly efficient converting circuits usually have a small gain range.

In order to utilize a highly efficient converting circuit which can be directly used with an input power source which has a large voltage fluctuation range, an auxiliary converting circuit is usually provided between the converting circuit and the power source. When an input voltage range of a converting circuit exceeds a predetermined range, an auxiliary converting circuit narrows the wide input voltage range so as to adapt for the converting circuit. For example, if a predetermined input voltage range of a converting circuit is 24V~36V. If the input voltage is 12V~48V, then it exceeds the predetermined input range. In this case, the auxiliary converting circuit typically reduces the width of the input voltage to 24V~36V first and then applies it to an input terminal of the converting circuit.

For example, Chinese Patent CN200780051915.3 provides a DC/DC converter including a pre-adjuster stage including a Buck converter; and a post-converter stage including a charge pump. The duty cycle of the pre-adjuster stage is controlled by a feedback path extending from the output terminal of the pre-adjuster stage or the post-converter stage. Based on the duty cycle, the pre-adjuster lowers the input DC voltage at a variable amount, and the post-converter increases or reduces the voltage at the output of the pre-adjuster at a positive or negative integer or fraction number.

However, such a design produces other problems. For example, no matter whether the input voltage is in the predetermined range or exceeds the predetermined range, the auxiliary converting circuit coupled to the main circuit is always in an operating state and consumes energy since it precedes the converting circuit. That is, in a case involving no auxiliary converting circuit (for example, the input circuit is in the predetermined range), the auxiliary converting circuit provided between the main circuit and the power source inevitably consumes energy.

Thus, such a design does not enhance the integral efficiency of the circuit, because the preceding auxiliary converting circuit would result in a loss while narrowing the input voltage range, and thus the advantage (the reduced loss) resulted from a small gain range is balanced out.

SUMMARY OF THE INVENTION

Preferred embodiments of the present invention provide a DC-DC converting apparatus including a DC voltage source that outputs a DC power supply voltage; a main circuit that converts an input voltage into an output voltage having a set value; an auxiliary circuit, coupled to the DC voltage source, that couples to the main circuit when the input voltage has a fluctuation exceeding a predetermined range so that an output voltage is maintained at the output voltage having the set value. When the input voltage exceeds the predetermined range, coupling the auxiliary circuit to the main circuit includes coupling the auxiliary circuit to an input end of the main circuit. When the input voltage exceeds the predetermined range, coupling the auxiliary circuit to the main circuit includes coupling the auxiliary circuit to an output end of the main circuit. The nominal upper limit of the fluctuation of the input voltage is equal or substantially equal to the upper limit of the predetermined range. The value by which the nominal range of fluctuation of the input voltage exceeds the predetermined range is smaller than the value of the difference between the upper limit and the lower limit.

A DC-DC converting apparatus according to a preferred embodiment of the present invention further includes a first energy storage circuit and a second energy storage circuit, two output terminals of the auxiliary circuit are electrically connected to two terminals of the second energy storage circuit; wherein when the auxiliary circuit is coupled to the main circuit, the auxiliary circuit charges the second energy storage circuit, and energy stored in the second energy storage circuit is then transmitted to the load via the main circuit.

A DC-DC converting apparatus according to a preferred embodiment of the present invention further includes a first energy storage circuit and a second energy storage circuit, two output terminals of the auxiliary circuit are electrically connected to two terminals of the second energy storage circuit, two terminals of the first energy storage circuit are connected to the output terminal of the main circuit; wherein when the auxiliary circuit is coupled to the main circuit, the second energy storage circuit provides an additional supplementary voltage to the output terminal of the load. In the DC-DC converting apparatus, the first energy storage circuit and the second energy storage circuit are preferably capacitors.

A DC-DC converting apparatus according to a preferred embodiment of the present invention further includes a controller which controls the charging or discharging of the second energy storage circuit by the main circuit and the auxiliary circuit; wherein when the controller controls the auxiliary circuit to charge the second energy storage circuit, the main circuit does not discharge the second energy storage circuit, or when the controller controls the auxiliary circuit to charge the second energy storage circuit, the main circuit does not charge the second energy storage circuit. The DC-DC converting apparatus may preferably further include a switch which is parallel with the second energy storage circuit, and when the input voltage does not exceed the predetermined range, the switch is turned on.

In a DC-DC converting apparatus according to a preferred embodiment of the present invention, the lower limit of the predetermined range includes a first threshold and a second threshold, and when the input voltage is higher than the first threshold, the auxiliary circuit is coupled to the main circuit, and when the input voltage is lower than the second threshold, the auxiliary circuit is disconnected with the main circuit. The auxiliary circuit includes an auxiliary transformer and an auxiliary switch, wherein the transformer and the auxiliary switch are connected in series to the two output terminals of the DC voltage source. In the DC-DC converting apparatus, the main circuit may preferably include a half bridge LLC circuit which includes a main transformer.

A method of controlling a DC-DC converting apparatus to output a constant voltage according to a preferred embodiment of the present invention, the DC-DC converting apparatus including a main circuit and an auxiliary circuit, the method including the step of detecting an input voltage; determining whether the detected input voltage is in a predetermined range; and if the detected input voltage is in the predetermined range, the auxiliary circuit is coupled to the main circuit by controlling a switch.

A method according to a preferred embodiment of the present invention including the step of coupling the auxiliary circuit to the main circuit includes coupling the auxiliary circuit to an input terminal of the main circuit. A method according to a preferred embodiment of the present invention including the step of coupling the auxiliary circuit to the main circuit includes coupling the auxiliary circuit to an output terminal of the main circuit. The main circuit includes a half bridge LLC circuit. The auxiliary circuit includes an auxiliary transformer and a first auxiliary switch.

A method according to a preferred embodiment of the present invention further includes when the first auxiliary switch is turned on and off at a certain frequency, the auxiliary circuit is coupled to the main circuit; and when the first auxiliary switch is turned off, the auxiliary circuit is not coupled to the main circuit.

A DC-DC converting apparatus according to a preferred embodiment of the present invention further includes a first energy storage circuit C1 and a second energy storage circuit C2, two output terminals of the auxiliary circuit are electrically connected to two terminals of the second energy storage circuit, two terminals of the first energy storage circuit are connected to the output terminal of the DC voltage source; wherein when the auxiliary circuit is coupled to the main circuit, the auxiliary circuit charges the second energy storage circuit, and energy stored in the second energy storage circuit is then transmitted to the load via the main circuit.

A DC-DC converting apparatus according to a preferred embodiment of the present invention further includes a first energy storage circuit C1 and a second energy storage circuit C2, two output terminals of the auxiliary circuit are electrically connected to two terminals of the second energy storage circuit, two terminals of the first energy storage circuit are connected to the output terminal of the main circuit; wherein when the auxiliary circuit is coupled to the main circuit, the second energy storage circuit provides an additional supplementary voltage to the output terminal of the load.

A method according to a preferred embodiment of the present invention further includes a switch which is connected in parallel with the second energy storage circuit, and when the input voltage does not exceed the predetermined range, the switch is turned on. The method may further include using a controller to control the charging or discharging of the second energy storage circuit by the main circuit and the auxiliary circuit, including when the controller controls the auxiliary circuit to charge the second energy storage circuit, the main circuit does not discharge the second energy storage circuit, or when the controller controls the auxiliary circuit to charge the second energy storage circuit, the main circuit does not charge the second energy storage circuit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
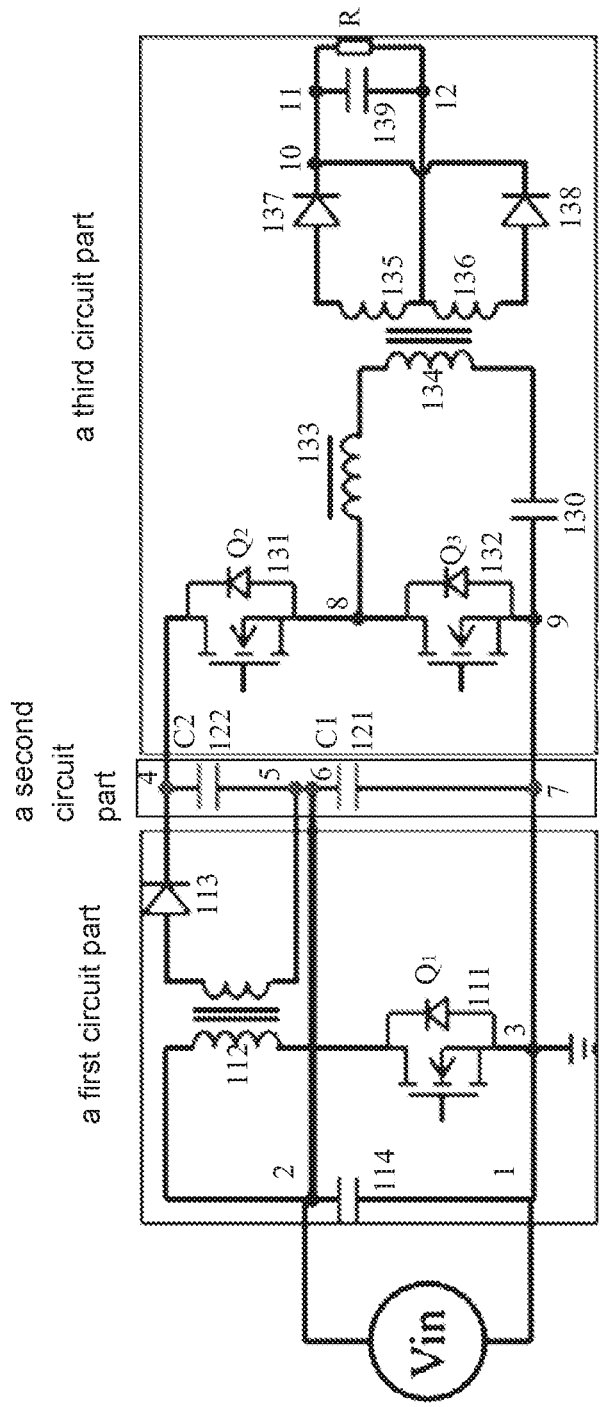
FIG. 1 illustrates a circuit of a DC-DC converting apparatus according to a preferred embodiment of the present invention.

The following is a detailed description of the present invention with reference to the preferred embodiments and the drawings which are only exemplary and do not limit the scope of the present invention. In the drawings, components with the same or similar reference signs operate in a similar way. The specific structure illustrated in the drawings are only exemplary. A person skilled in the art could make modifications within the true range of the present invention.

In order to avoid the energy loss resulted from the preceded auxiliary circuit narrowing the input voltage range, preferred embodiments of the present invention provide an improved auxiliary circuit, when the input voltage exceeds a predetermined range, the auxiliary converting circuit is coupled to the main circuit via a controller so as to convert the input voltage into the predetermined range, and when the input voltage is in the predetermined range, the auxiliary circuit is disconnected via the controller so as to prevent the auxiliary circuit from consuming energy.

In a preferred embodiment of the present invention, the output terminal of the auxiliary circuit is coupled to the input terminal of the main circuit. In this connection mode, when the output terminal of the auxiliary circuit is coupled to the input terminal of the main circuit, the discharging is performed to the main circuit. In another preferred embodiment of the present invention, the output terminal of the auxiliary circuit is coupled to the input terminal of the main circuit. In this mode, when the output terminal of the auxiliary circuit is coupled to the output terminal of the main circuit, an additional supplementary voltage is provided to the load of the output terminal.

FIG. 1 illustrates a circuit of a DC-DC converting apparatus in a series mode according to a preferred embodiment of the present invention. In FIG. 1, the DC-DC converting apparatus includes a DC power source, a first circuit portion, a second circuit portion, and a third circuit portion.

The first circuit portion includes a switch Q1 111, a transformer 112, a diode 113, and a capacitor 114. In this disclosure, the first circuit portion is also referred to as an auxiliary circuit. Therefore, the term "first circuit portion" is interchangeably used with the term "auxiliary circuit". The second circuit portion includes a capacitor C1 121 and a capacitor C2 122. In preferred embodiments of the present invention, the term "capacitor" is also referred to as "energy storage circuit" or "energy storage element". The third circuit portion includes a switch Q2 131, a switch Q3 132, a transformer 134, and an inductor 133. In this disclosure, the third circuit portion is also referred to as a "main circuit". Therefore, the term "third circuit portion" is interchangeably used with the term "main circuit".

As shown in FIG. 1, two output terminals of the DC power source Vin are coupled to nodes 1 and 2. One input terminal of the transformer 112 on the primary side is coupled to the node 2, and the other input terminal is coupled to the node 3 via the switch Q1 111. One output terminal of the transformer 112 on the second side is coupled to the node 4 via the diode 113, and the other output terminal is coupled to the node 5. The capacitor 114 is coupled between the nodes 1 and 2. The capacitor 114 is used as a buffer to protect the circuit system when the input voltage has a large fluctuation.

Two terminals of the capacitor C1 121 of the second circuit portion are coupled to nodes 6 and 7, respectively. Two terminals of the capacitor C2 122 of the second circuit portion are coupled to nodes 4 and 5, respectively.

Further, as shown in FIG. 1, the switch Q2 131 is coupled between the nodes 4 and 8, and the switch Q3 132 is coupled between the nodes 8 and 9. The node 8 is coupled to one input terminal of the transformer 134 on the primary side via the inductor 133, and the node 9 is coupled to the other input terminal of the transformer 134 on the primary side via the capacitor 130.

The transformer 134 includes a secondary side which includes a plurality of secondary portions. As shown in FIG. 1, the secondary side of the transformer 134 may preferably include, for example, two secondary portions 135, 136. The secondary portion 135 includes one output terminal coupled to the node 10 via the diode 137. The secondary portion 136 includes one output terminal coupled to the node 10 via the diode 138. The secondary portions 135, 136 share one output terminal, and the shared output terminal is coupled to the node 12. The capacitor 139 and the load resistor R are coupled in parallel between the node 11 and the node 12.

In the third circuit portion, the inductor 133, the parasitic inductance of the transformer 134 on the primary side, and the capacitor 130 define a half bridge LLC circuit. The half bridge LLC circuit may preferably utilize the current waveform illustrated as I_part3 in FIG. 2 when the energy is transmitted via control switches Q2 131, Q3 132.

The circuit system (i.e., the DC-DC converting apparatus) according to a preferred embodiment of the present invention further includes a controller (not illustrated) that controls on and off of the switches Q1 111, Q2 131, Q3 132. In a preferred embodiment of the present invention, when the switch Q1 111 is turned off via the controller, the auxiliary circuit does not function in the entire circuit system. That is, the auxiliary circuit is not coupled to the input terminal of the main circuit. When the switch Q1 111 is turned on and off at a certain frequency via the controller, a current is induced on the primary side of the transformer so that the energy is transmitted to the secondary side of the transformer. At this moment, the auxiliary circuit is coupled to the main circuit, and thus, functions in the entire circuit system.

Preferred embodiments of the present invention are intended to utilize an output of a constant voltage. In the preferred embodiment shown in FIG. 1, the range of the input of the DC power source Vin may preferably be, for example, about 36V-72V. If the desired constant output voltage of the DC-DC converting apparatus is about 12V, then the output gain is about ⅓-⅙. However, if the ratio of the transformer 134 is about 3, the rate of gain change (i.e. the ratio of the maximum gain and the minimum gain) has a range of about 2-1. Due to the characteristics of the LLC lines, if the rate of gain change has a range of about 2-1, then it is difficult to obtain a good effect in the full gain range, therefore, the rate of gain change is large.

The rate of gain change of the half bridge LLC lines is preferably set to be about 1-1.5, for example, that is, the predetermined input voltage range is about 48V-72V, the output voltage is about 12V. At this time, if the input voltage is about 36V, then the input voltage goes beyond the scope of about 48V-72V. In order to assure the normal operation where the input voltage exceeds the predetermined input voltage range (i.e. about 48V-72V), in a preferred embodiment of the present invention, a capacitor C2 122 is provided to supply additional energy, in addition to the capacitor C1 121.

Specifically, when the input voltage is about 36V, the voltage across the capacitor C1 121 is about 36V. At this time, the switch Q1 111 is controlled by the controller so as to couple the auxiliary circuit in the circuit system and define a series connection with the main circuit. Since the auxiliary circuit is coupled in series to the main circuit, the capacitor C2 122 in the auxiliary circuit is also coupled in the circuit system.

By setting the voltage across the capacitor C2 122 to about 12V, for example, the voltage on the input side of the main circuit becomes about 48V (i.e., the voltage about 36V on the capacitor C1 121 plus the voltage of about 12V on the capacitor C2 122). That is, where the input voltage is about 36V (which goes beyond the predetermined voltage range about 48V-72V), the additional about 12V voltage is provided by adding the capacitor C2 122, the voltage on the input side of the main circuit becomes about 48V (which is in the predetermined voltage range), so that the circuit system is still able to operate normally. In other words, in the total output energy, about ¼ of the energy is delivered to the second circuit portion via the first circuit portion.

When the input voltage is in the predetermined voltage range, the switch Q1 111 is controlled by the controller to be turned off so as to disconnect the auxiliary circuit from the circuit system such that the capacitor C2 122 is disconnected from the main circuit. Since the capacitor C2 122 is not coupled in the circuit system (i.e., the auxiliary circuit does not operate), only the capacitor C1 121 is delivering the energy during this operation. At this time, since the current input by the third circuit portion is pulsed, the pulse current flows into the third circuit portion via the capacitor C2 122.

When the input voltage exceeds the predetermined input voltage range, the switch Q1 111 is turned off and on at a certain frequency by the controller so as to couple the auxiliary circuit to the main circuit such that the capacitor C2 122 is coupled in the circuit system.

By providing the auxiliary circuit, a portion of the input energy is able to be adjusted so as to adapt for the narrow predetermined input range and increase the efficiency of the entire circuit system.

In addition, in a preferred embodiment of the present invention, the nominal upper limit of the fluctuation range of the input voltage can preferably be set to be equal or substantially equal to the upper limit of the predetermined input voltage range, for example.

Here, the nominal upper limit, the lower limit, and the range of the input voltage can be understood as follows: the input voltage has a fluctuation within this range and the circuit devices and functions operate normally, if it has a fluctuation outside of this range, a protection device needs to be used in some circumstances (the protection device is not in the scope of the present invention). That is, the fluctuation of the input voltage is free, so that the voltage range in which the loaded circuit and the components can operate normally could be set to be the nominal upper limit, the lower limit, and the range.

Moreover, the nominal lower limit can be set for the fluctuation range of the input voltage, and it can preferably be set so that the value by which the fluctuation range exceeds the predetermined input voltage range is smaller than the value of the difference of the upper limit and the lower limit of the predetermined input voltage range. This is because it is preferable that the probability of using the main circuit is higher than the probability of using the auxiliary circuit.

It is to be noted that the settings for the fluctuation range of the input voltage are only exemplary and the present invention is not limited thereto.

Moreover, in a preferred embodiment of the present invention, a control logic may preferably be provided to determine whether the input voltage is in the predetermined input voltage range. For example, the control logic may preferably be a control component defined by an electronic device, such as a single-chip microcomputer, for example. When determining the input voltage, the input voltage could be detected, then based on a threshold it is determined whether the input voltage is in the voltage value range computed according to the gain range of the main circuit. If it is in the voltage value range, the auxiliary circuit is connected. If it is not in the voltage value range, the auxiliary circuit is not connected.

In a preferred embodiment of the present invention, the threshold which is used to determine whether the input voltage is in the voltage value range may be a range rather than a fixed value so as to avoid the switch being frequently turned on and off. In a preferred embodiment of the present invention, this threshold may preferably include a first threshold and a second threshold, and when the input voltage is higher than the first threshold, the auxiliary circuit is coupled to the main circuit, and when the input voltage is lower than the second threshold, the auxiliary circuit is disconnected from the main circuit. Although this disclosure provides two thresholds for the lower limit of the predetermined voltage input range, it should be understood that the number of the thresholds is not limited by this, and can be any suitable number of thresholds.

In the circuit system illustrated in FIG. 1, when the auxiliary circuit inputs the energy to the second circuit portion, it is required that no energy is transmitted from the second circuit portion to the main circuit. The reason for this is that if the energy flows into and out of the second circuit portion simultaneously, then there is no way to control the ratio of the energy flowing through the first circuit portion and the total energy.

Figure 2:
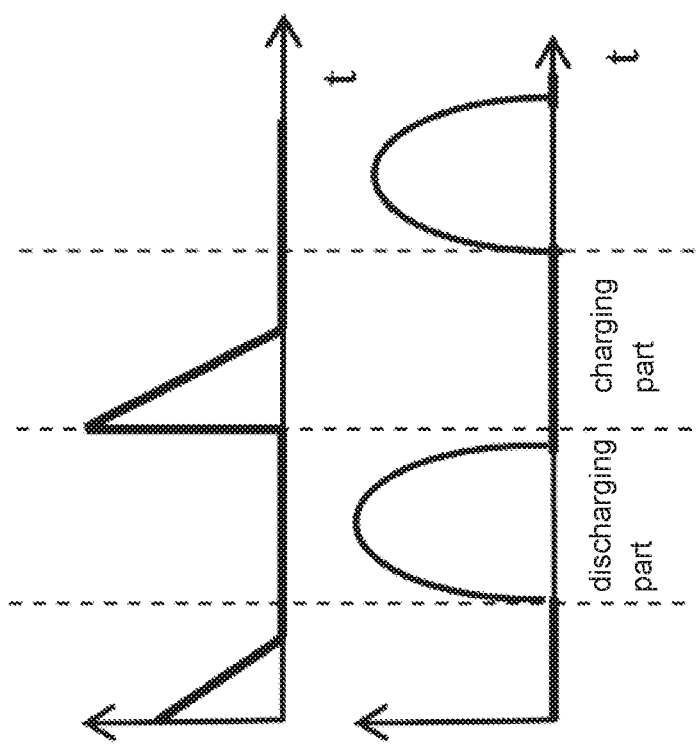
FIG. 2 illustrates a current waveform when the auxiliary circuit of FIG. 1 is outputting the energy and a current waveform when an energy storage circuit C1 in a second portion of the circuit provides an energy output to the load.

FIG. 2 illustrates a waveform of the current flowing through the diode 113 when the auxiliary circuit of FIG. 1 charges C2 122 and a waveform of the current flowing through the switch Q2 131 when energy is transmitted to the load via the main circuit. As shown in FIG. 2, I_part1 indicates the auxiliary circuit charging the capacitor C2 122 in the second circuit portion, and I_part3 indicates the capacitor C1 121 and the capacitor C2 122 in the second circuit portion together discharging to the main circuit.

In order to better control the ratio of the energy flowing through the first circuit portion and the total energy, it is preferable that the waveform I_part1 and the waveform I_part3 are separated from each other in phases.

With the combination of the control of the switches Q2 131 and Q3 132 in the half bridge LLC circuit, the waveform I_part1 and the waveform I_part3 in FIG. 2 are separated from each other in phases by controlling the switch Q1 111 in the auxiliary circuit of FIG. 1.

Specifically, where the auxiliary circuit is coupled to the main circuit, i.e., the switch Q1 111 is turned on and off alternately, the frequency of the switch Q1 111 can preferably be controlled by a controller so that in the first circuit portion the current flows through the diode 113 and charges the capacitor C2 122 in the second circuit portion and in the meantime the switch Q2 is turned off. At this time, the capacitor C1 121 in the second circuit portion does not deliver the energy to the third circuit portion. When the auxiliary circuit no longer charges the capacitor C2 122, i.e., when the charging is complete, the switch Q2 is turned on. At this time, the capacitor C1 121 and the capacitor C2 122 together deliver the energy to the third circuit portion so that the energy is transmitted to the load.

The frequency of the switch Q1 111 is controlled by the controller so that when the first circuit portion delivers the energy to the capacitor C2 122 in the second circuit portion, the capacitor C1 121 in the second circuit portion does not output the energy to the third circuit portion.

When the output terminal of the auxiliary circuit is coupled to the input terminal of the main circuit, the inputs of both the main circuit and the auxiliary circuit are connected to the power source voltage in parallel. Therefore, if there is no separation in phases, the currents in the main circuit and the auxiliary circuit will be assigned according to the ratio of the resistance values of the two circuits on the primary sides.

Therefore, the waveform I_part1 and the waveform I_part3 are separated so as to easily control the magnitude of the current flowing through the first circuit portion without influence from the resistance ratio.

Figure 3:
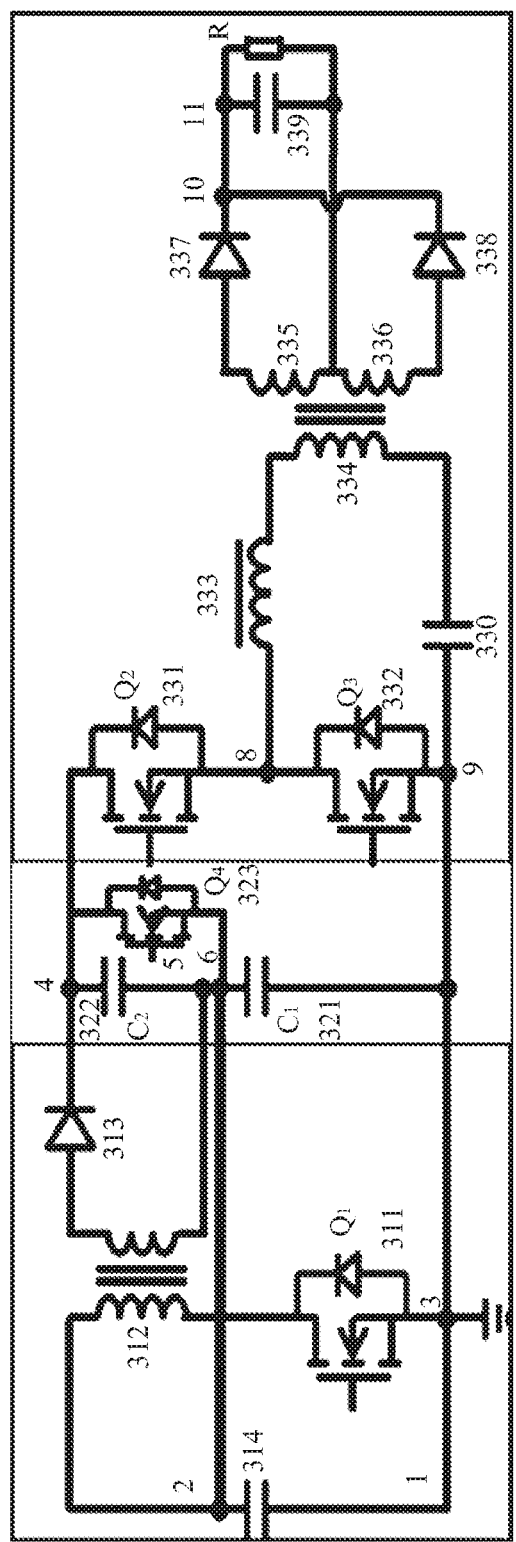
FIG. 3 illustrates a circuit of a DC-DC converting apparatus according to another preferred embodiment of the present invention.

FIG. 3 illustrates a circuit of a DC-DC converting apparatus according to another preferred embodiment of the present invention. The DC-DC converting apparatus shown in FIG. 3 has a circuit structure similar to that of FIG. 1. However, in contrast to the circuit structure of FIG. 1, the circuit structure of FIG. 3 includes a switch Q4 323. For convenience, similar components are omitted in FIG. 3.

As shown in FIG. 3, the switch Q4 323 in the second circuit portion is coupled between the nodes 6 and 4, and defines a parallel connection with the capacitor C2 322.

When the auxiliary circuit is not coupled to the main circuit i.e. the input voltage does not exceed the predetermined range, the switch Q4 323 is turned on by the controller. Therefore, the capacitor C2 322 is short-circuited, and the influence on the entire circuit caused by the current flowing through the C2 322 and the resistance, the inductance, and other influences on the corresponding auxiliary circuit is reduced or prevented, thus facilitating the energy delivery in the circuit system.

Figure 4:
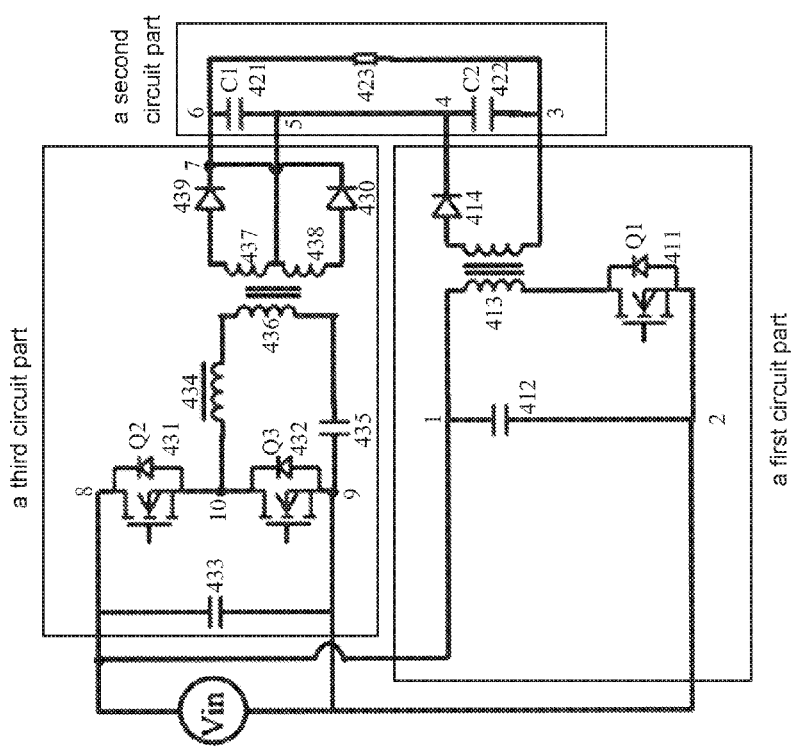
FIG. 4 illustrates a circuit of a DC-DC converting apparatus according to yet another preferred embodiment of the present invention.

FIG. 4 illustrates a circuit of a DC-DC converting apparatus according to another preferred embodiment of the present invention.

In FIG. 4, a DC-DC converting apparatus 400 includes a DC power source, a first circuit portion, a second circuit portion, and a third circuit portion.

The first circuit portion includes a switch Q1 411, a transformer 413, a diode 414, and a capacitor 412. In this disclosure, the first circuit portion is also referred to as an auxiliary circuit. Therefore, the term "first circuit portion" is interchangeably used with the term "auxiliary circuit". The second circuit portion includes capacitors C1 421, C2 422 and a load resistor 423. The third circuit portion includes a switch Q2 431, a switch Q3 432, a transformer 436, an inductor 434, and a capacitor 435. In this disclosure, the third circuit portion is also referred to as a "main circuit". Therefore, the term "third circuit portion" is interchangeably used with the term "main circuit".

As shown in FIG. 4, the first circuit portion is coupled to two output terminals of the DC power source. In the first circuit portion, the capacitor 412 is coupled between the node 1 and the node 2. The primary side of the inductor 413 is connected in series with the switch Q1 411, and both of the primary side of the inductor 413 and the switch Q1 411 are also coupled between the node 1 and the node 2. The capacitor 412 is used as a buffer to protect the circuit system when the input voltage has a large fluctuation, and to stabilize the wave form of an input voltage.

In the second circuit portion, the load resistor 423 is coupled between the node 3 and the node 6. The capacitor C2 422 is coupled between the node 3 and the node 4. The node 4 is connected via a diode 414 to one terminal of the transformer 413 on the secondary side. The node 3 is connected to another terminal of the transformer 413 on the secondary side. The capacitor C1 421 is coupled between the node 5 and the node 6.

In the third circuit portion, the capacitor 433 is connected to two terminals of the DC power source. The switch Q2 431 is coupled between the node 8 and the node 10. The switch Q3 432 is coupled between the node 9 and the node 10. One terminal of the inductor 434 is coupled to the node 10, and the other terminal is coupled to one terminal of the transformer 436. The other terminal of the transformer 436 is coupled to the node 9 via the capacitor 435.

The transformer 436 includes a secondary side which includes a plurality of secondary portions. As shown in FIG. 4, the secondary side of the transformer 436 may preferably include, for example, two secondary portions 437, 438. The secondary portion 437 includes one output terminal coupled to the node 7 via the diode 439. The secondary portion 438 includes one output terminal coupled to the node 7 via another diode 430. The secondary portions 437, 438 share one output terminal, and this shared output terminal is coupled to the node 5.

In a preferred embodiment of the present invention shown in FIG. 4, the range of the input of the DC power source Vin may preferably be, for example, about 36V-72V. If the desired constant output voltage of the DC-DC converting apparatus is about 12V, then the output gain is about ⅓-⅙. However, if the ratio of the transformer 436 is about 3, the rate of gain change (i.e. the ratio of the maximum gain and the minimum gain) has a range of about 2-1. Due to the characteristics of the LLC lines, if the rate of gain change has a range of about 2-1, then it is difficult to obtain a good effect in the full gain range. Therefore, the rate of gain change is large.

Now the rate of gain change of the half bridge LLC lines is preferably set to be about 1-1.5, that is, the predetermined input voltage range is about 48V-72V, the output voltage is about 12V. Moreover, if the input voltage is about 36V, this means it goes beyond the scope of about 48V-72V. In order to ensure the normal operation where the input voltage exceeds the predetermined input voltage range (i.e., about 48V-72V), in a preferred embodiment of the present invention, a capacitor C2 422 is provided to supply additional supplemental voltage in addition to the capacitor C1 421.

Specifically, under the predetermined voltage range about 48V-72V, since it is required to output a constant voltage of about 12V, the range of output gain is about ¼-⅙. Where the output gain range is about ¼-⅙, if the input voltage is about 36V (which exceeds the predetermined voltage range about 48V-72V), the output voltage of the converting apparatus has a maximum of about 9V.

In order to ensure the output of the constant voltage of about 12V, an additional capacitor is provided to generate about 3V of compensatory voltage so that the output voltage is kept at about 12V. In the circuit system of FIG. 4, the voltage compensation is provided by connecting the auxiliary circuit in parallel in the main circuit.

When the input voltage (for example, about 36V) exceeds the predetermined voltage range of 48V-72V, the capacitor C2 422 is coupled into the circuit system by connecting the third circuit portion to the first circuit portion in parallel. At this time, the voltage across the capacitor C1 421 is about 9V. By setting the voltage across the capacitor C2 422 to be about 3V, it is ensured that the output voltage of the output terminal is about 12V. In the total output energy, about ¼ of the energy is delivered to the second circuit portion via the first circuit portion.

When the input voltage is in the predetermined input voltage range, the switch Q1 411 is turned off by the controller (not illustrated) so as to disconnect the auxiliary circuit such that the capacitor C2 422 is not coupled to the circuit system (i.e., the auxiliary circuit does not operate).

When the input voltage exceeds the predetermined input voltage range, the switch Q1 is controlled by the controller at a frequency to be alternately turned on and off so as to couple the auxiliary circuit to the main circuit. Therefore, the capacitor C2 422 is coupled in the circuit system so as to provide the supplemental voltage at the load output terminal of the circuit system.

By providing the auxiliary circuit, a portion of the input energy is able to be adjusted so as to adapt for the narrow predetermined input range and increase the efficiency of the entire circuit system.

Moreover, in a preferred embodiment of the present invention, a control logic may preferable be provided to determine whether the input voltage is in the predetermined input voltage range. For example, the control logic may preferably be a control component defined by an electronic device, such as a single-chip microcomputer, for example. When determining the input voltage, the input voltage may be detected, and then, based on a threshold, it is determined whether the input voltage is in the voltage value range computed according to the gain range of the main circuit. If it is in the voltage value range, the auxiliary circuit is connected. If it is not in the voltage value range, the auxiliary circuit is not connected.

In a preferred embodiment of the present invention, the threshold which is used to determine whether the input voltage is in the voltage value range may preferably be a range rather than a fixed value so as to avoid the switch being frequently turned on and off. In a preferred embodiment of the present invention, this threshold may preferably include a first threshold and a second threshold, and when the input voltage is higher than the first threshold, the auxiliary circuit is coupled to the main circuit, and when the input voltage is lower than the second threshold, the auxiliary circuit is disconnected from the main circuit. Although this disclosure describes two thresholds for the lower limit of the predetermined voltage input range, the number of the thresholds is not limited by this and may be any suitable number of thresholds.

In the circuit system illustrated in FIG. 4, when the auxiliary circuit inputs the energy to the second circuit part, it is required that no energy is transmitted from the second circuit portion to the main circuit. The reason for this is that if the energy flows into and out of the second circuit portion simultaneously, then there is no way to control the ratio of the energy flowing through the first circuit portion and the total energy.

Figure 5:
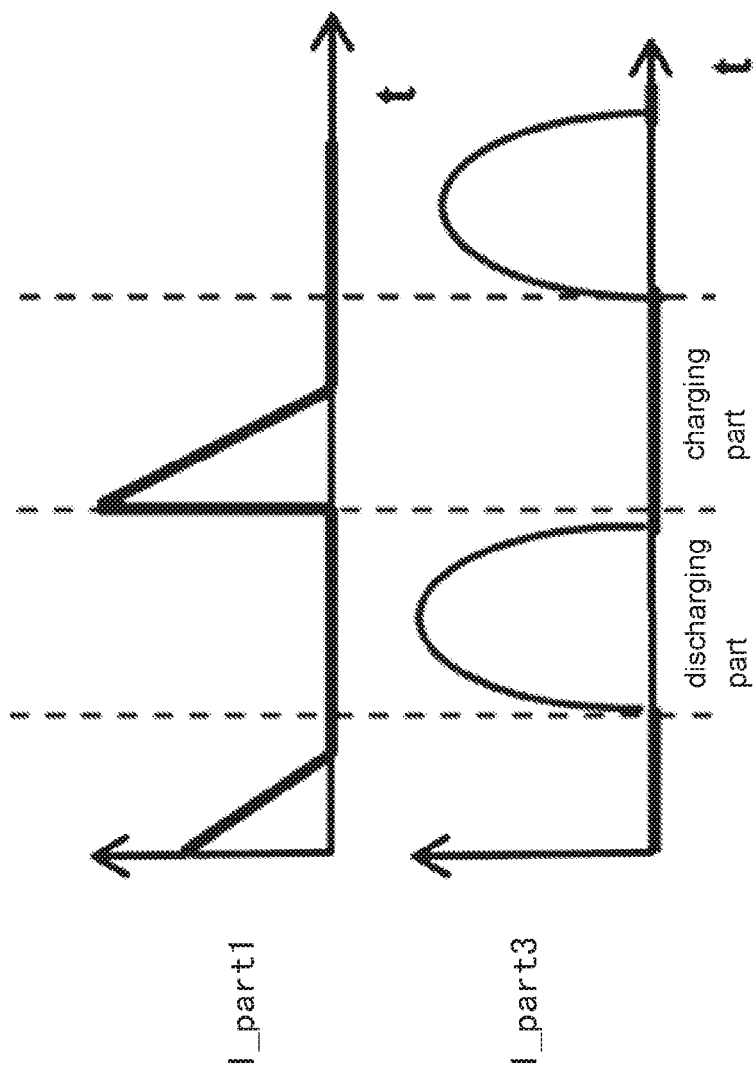
FIG. 5 illustrates a current waveform when the auxiliary circuit is outputting the energy and a current waveform when the main circuit is outputting the energy to an energy storage circuit C1.

FIG. 5 illustrates a current waveform when the auxiliary circuit is outputting the energy and a current waveform when the main circuit is outputting the energy to an capacitor C1 421. I_part1 indicates the auxiliary circuit inputting the energy to the capacitor C2 422, and I_part3 indicates the main circuit outputting the energy to the capacitor C1 421.

By controlling the switch Q1 411 in the auxiliary circuit of FIG. 4, the waveform I_part1 and the waveform I_part3 of FIG. 5 are separated in phases.

Specifically, where the auxiliary circuit is coupled to the main circuit, i.e., the switch Q1 411 is turned on and off alternately, the frequency of the switch Q1 411 is controlled by a controller so that when the first circuit portion does not deliver the energy to the capacitor C2 422 in the second circuit portion and the third circuit portion outputs the energy to the C1 421 in the second circuit portion.

The frequency of the switch Q1 411 is controlled by the controller so that when the first circuit portion delivers the energy to the capacitor C2 422 in the second circuit portion, the third circuit portion does not output the energy to the capacitor C1 421 in the second circuit portion.

In other words, when the capacitor C1 421 is charged via the third circuit portion, the capacitor C2 422 is discharging; and when the capacitor C2 422 is charged via the first circuit portion, the capacitor C1 421 is discharging. In this manner, the capacitor C1 421 and the capacitor C2 422 function in an alternative way so as to be separated in phases.

When the output terminal of the auxiliary circuit is coupled to the output terminal of the main circuit, if they are not separated in phases, the currents on the main circuit and the auxiliary circuit will be assigned according to the ratio of the resistance values of the secondary side of the transformer. Therefore, the waveform I_part1 and the waveform I_part3 are separated so as to easily control the magnitude of the current flowing through the first circuit portion without influence from the resistance ratio.

On the other hand, when the output of the auxiliary circuit is coupled to the output terminal of the main circuit, if there is no separation in phases (i.e., there are overlapping phases), then the efficiency of the entire circuit (i.e., the total efficiency of the auxiliary circuit and the main circuit, Efficiency=Output electricity/Input electricity) is computed by multiplying. For example, the efficiency of the auxiliary circuit is about 70%, the efficiency of the main circuit is about 90%, and when there are overlapping phases, the total efficiency is the efficiency of the auxiliary circuit×the efficiency of the main circuit=about 70%×about 90%=about 63%. If there is a full separation in phases (i.e., there is no overlapping phase), the total efficiency is as follows: (a×the efficiency of the auxiliary circuit+b×the efficiency of the main circuit)/(a+b)=about 70%~about 90%, in which a is the time from the auxiliary circuit output to the output terminal of the main circuit (i.e., the time during which the auxiliary circuit inputs the energy to the capacitor C2 422), b is the time of the main circuit output (i.e., the time during which the main circuit outputs the energy to the capacitor C1 421). So, when the auxiliary circuit output is coupled to the output terminal of the main circuit, the total efficiency with separated phases (i.e., no phase overlapping exists) is significantly higher.

Figure 6:
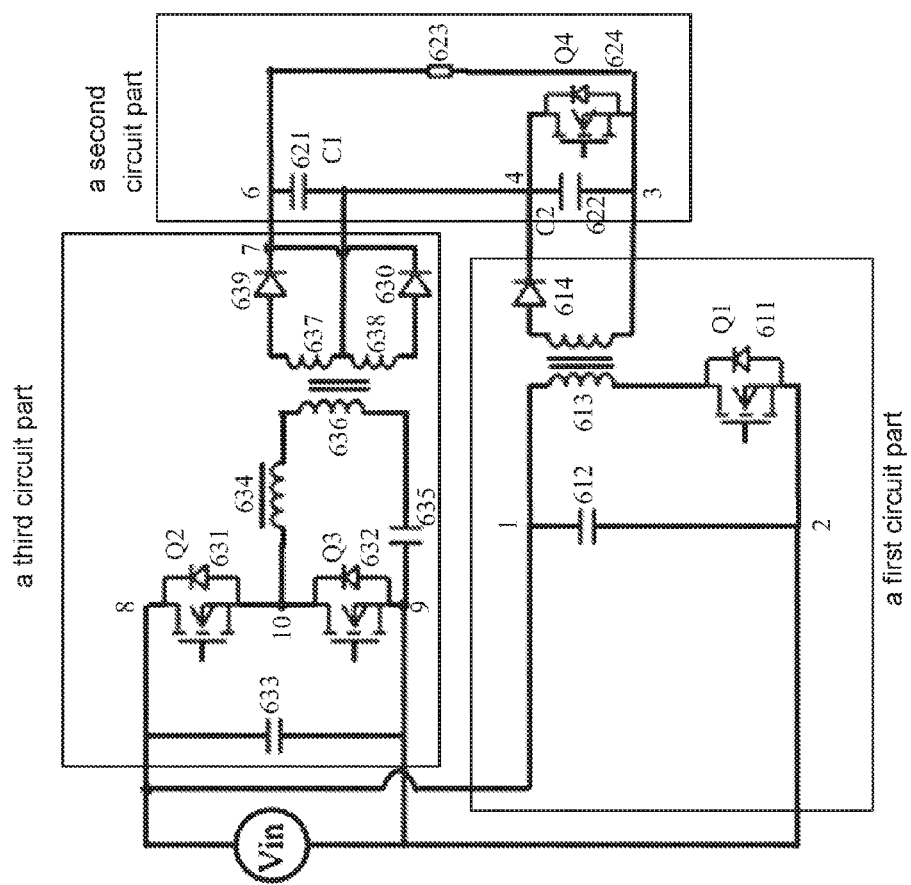
FIG. 6 illustrates a circuit of a DC-DC converting apparatus according to another preferred embodiment of the present invention.

FIG. 6 illustrates a circuit of a DC-DC converting apparatus in a parallel mode according to another preferred embodiment of the present invention. The DC-DC converting apparatus of FIG. 6 has a circuit structure similar to that of FIG. 4. However, in contrast to the circuit structure of FIG. 4, the circuit structure of FIG. 6 includes a switch Q4 624. For convenience, similar components are omitted in FIG. 6.

As shown in FIG. 6, the switch Q4 624 is coupled between the nodes 3, 4, and is connected in parallel with the capacitor C2 622.

When the auxiliary circuit is not coupled to the main circuit, i.e., the input voltage does not exceed the predetermined range, the switch Q4 624 can be turned on by the controller. Therefore, the capacitor C2 622 is short-circuited, and the influence on the entire circuit caused by the current flowing through the C2 622 and the resistance, the inductance, and other influences on the corresponding auxiliary circuit is reduced or prevented, thus facilitating the energy delivery in the circuit system.

The above disclosure describes the adaptive voltage range of the main circuit as being greater than or equal to the upper limit of the input voltage. However, it should be understood that the upper limit of the adaptive voltage range of the main circuit may also be less than the upper limit of the input voltage. If the upper limit of the adaptive voltage range of the main circuit is less than the upper limit of the input voltage, proper adjustments can be made according to the above disclosure and may also be utilized. However, if the input voltage is above the upper limit of the adaptive voltage range of the main circuit, a negative voltage is required to be applied to the C2, the auxiliary circuit will not transmit the energy to the main circuit, but the energy of the main circuit is reversely transmitted to the auxiliary circuit. Therefore this will result in a loss and the efficiency of the preferred embodiment is higher.

In the preferred embodiments of the present invention, the DC voltage source is an electronic apparatus that provides a stable DC power supply voltage for a load, for example, a dry battery, a storage battery, a DC generator, other suitable DC voltage source may be used.

In the preferred embodiments of the present invention, the switch may be a field effect transistor widely used in analog circuits and digital circuits, for example, a MOSFET. The MOSFET may be divided into two types: "N-type" and "P-type" according to different polarities of the functioning carriers, usually called NMOSFET and PMOSFET.

In the preferred embodiments of the present invention, a controller or a control logic may be hardware or software. For example, a controller or a control logic may include one or more of the following: a general processor, DSP, ASIC, FPGA, or other programmable logic devices, discrete gates or transistor logic, discrete hardware components, or other possible combination designed to perform the functions disclosed above. The general processor may be a microprocessor, but alternatively, the processor may be any conventional processor, controller, microcontroller, or status machine. The processor may be defined by a combination of computing devices, for example, a combination of DSP and microprocessor, a plurality of microprocessors, one or more microprocessors cooperating with DSP cores, or any similar configurations.

When a controller or a control logic is provided in the form of software, the controller or control logic may utilize firmware, middleware, or micro-codes. Program codes or code segments to perform necessary tasks may be stored in computer readable or processor readable mediums or other storages. The processor may utilize these necessary tasks. The code segments may indicate regulations, functions, sub programs, programs, routines, sub routines, modules, packages, classes, or instructions, data structures, or program statement, or any combination thereof. By transferring and/or receiving information, data, independent variables, parameters, or storage contents, one code segment may be coupled to another code segment or hardware circuits. Information, independent variables, parameters, or data, for example, may be transmitted, transferred, or communicated via any proper processes, such as storage sharing, message delivering, token delivering, network transmission and other processes.

In the disclosure of preferred embodiments of the present invention, the term "couple" indicates direct or indirect connections among components. In addition, the term "couple" indicates not only wired connections but also wireless connections, and even various other connections.

In the disclosure of preferred embodiments of the present invention, the term "charging" indicates the energy flowing into the energy storage element, such as the capacitor. And the term "discharging" indicates the energy flowing out of the energy storage element, such as the capacitor.

Although various preferred embodiments of the present invention are disclosed, it should be understood that they are only exemplary without limitation. A person skilled in the art may make various modifications without deviating from the spirit and range of the present invention. Therefore, the width and the range of the above disclosure of preferred embodiments of the present invention are not limited by the exemplary preferred embodiments but should be defined only according to the claims and the equivalents thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converting apparatus comprising:
   a DC voltage source that outputs a DC power supply voltage;
   a main circuit that converts an input voltage into an output voltage with a set value;
   an auxiliary circuit, coupled to the DC voltage source, that couples to the main circuit when the input voltage has a fluctuation exceeding a predetermined range so that an output voltage is maintained at the output voltage with the set value; and
   a first energy storage circuit and a second energy storage circuit, wherein
   the first energy storage circuit is connected in series to the second energy storage circuit, two output terminals of the auxiliary circuit being electrically connected to two terminals of the second energy storage circuit, and two terminals of the first energy storage circuit being connected to an output terminal of the DC voltage source; and
   when the auxiliary circuit is coupled to the main circuit, the auxiliary circuit charges the second energy storage circuit, and energy stored in the second energy storage circuit is then transmitted to a load via the main circuit.

2. The DC-DC converting apparatus according to claim 1, wherein when the input voltage exceeds the predetermined range, coupling the auxiliary circuit to the main circuit includes coupling the auxiliary circuit to an input end of the main circuit.

3. The DC-DC converting apparatus according to claim 1, wherein a nominal upper limit of fluctuation of the input voltage is equal or substantially equal to an upper limit of the predetermined range.

4. The DC-DC converting apparatus according to claim 3, wherein a lower limit of the predetermined range includes a first threshold and a second threshold, and when the input voltage is higher than the first threshold, the auxiliary circuit is coupled to the main circuit, and when the input voltage is lower than the second threshold, the auxiliary circuit is disconnected from the main circuit.

5. The DC-DC converting apparatus according to claim 1, wherein a value by which a nominal range of fluctuation of the input voltage exceeds the predetermined range is smaller than a value of a difference of an upper limit and a lower limit of the predetermined range.

6. The DC-DC converting apparatus according to claim 1, wherein the first energy storage circuit and the second energy storage circuit include capacitors.

7. The DC-DC converting apparatus according to claim 6, further comprising:
   a controller that controls charging and/or discharging of the second energy storage circuit by the main circuit and the auxiliary circuit; wherein
   when the controller controls the auxiliary circuit to charge the second energy storage circuit, the main circuit does not discharge the second energy storage circuit, or when the controller controls the auxiliary circuit to charge the second energy storage circuit, the main circuit does not charge the second energy storage circuit.

8. The DC-DC converting apparatus according to claim 6, further comprising:
   a switch connected in parallel with the second energy storage circuit; wherein
   when the input voltage does not exceed the predetermined range, the switch is turned on.

9. The DC-DC converting apparatus according to claim 6, wherein the auxiliary circuit includes an auxiliary transformer and an auxiliary switch connected in series to two output terminals of the DC voltage source.

10. The DC-DC converting apparatus according to claim 6, wherein the main circuit includes a half bridge LLC circuit which includes a main transformer.

11. A DC-DC converting apparatus comprising:
a DC voltage source that outputs a DC power supply voltage;
a main circuit that converts an input voltage into an output voltage with a set value;
an auxiliary circuit, coupled to the DC voltage source, that couples to the main circuit when the input voltage has a fluctuation exceeding a predetermined range so that an output voltage is maintained at the output voltage with the set value; and
a first energy storage circuit and a second energy storage circuit, wherein
the first energy storage circuit is connected in series to the second energy storage circuit, two output terminals of the auxiliary circuit being electrically connected to two terminals of the second energy storage circuit, and two terminals of the first energy storage circuit being connected to an output terminal of the main circuit; and
when the auxiliary circuit is coupled to the main circuit, the second energy storage circuit provides an additional supplementary voltage to an output terminal of a load.

12. The DC-DC converting apparatus according to claim 11, wherein when the input voltage exceeds the predetermined range, coupling the auxiliary circuit to the main circuit includes coupling the auxiliary circuit to an output end of the main circuit.

13. The DC-DC converting apparatus according to claim 11, wherein a nominal upper limit of fluctuation of the input voltage is equal or substantially equal to an upper limit of the predetermined range.

14. The DC-DC converting apparatus according to claim 11, wherein a value by which a nominal range of fluctuation of the input voltage exceeds the predetermined range is smaller than a value of a difference of an upper limit and a lower limit of the predetermined range.

15. The DC-DC converting apparatus according to claim 11, wherein the first energy storage circuit and the second energy storage circuit include capacitors.

16. The DC-DC converting apparatus according to claim 15, further comprising:
a controller that controls charging and/or discharging of the second energy storage circuit by the main circuit and the auxiliary circuit; wherein
when the controller controls the auxiliary circuit to charge the second energy storage circuit, the main circuit does not discharge the second energy storage circuit, or when the controller controls the auxiliary circuit to charge the second energy storage circuit, the main circuit does not charge the second energy storage circuit.

17. The DC-DC converting apparatus according to claim 15, further comprising:
a switch connected in parallel with the second energy storage circuit; wherein
when to input voltage does not exceed the predetermined range, the switch is turned on.

18. A method of controlling a DC-DC converting apparatus to output a constant voltage, the DC-DC converting apparatus including a main circuit and an auxiliary circuit, the method comprising the steps of:
detecting an input voltage;
determining whether the detected input voltage is in a predetermined range; and
if the detected input voltage is in the predetermined range, coupling the auxiliary circuit to the main circuit by controlling a switch, wherein
the DC-DC converting apparatus includes a first energy storage circuit and a second energy storage circuit, the first energy storage circuit is connected in series to the second energy storage circuit, two output terminals of the auxiliary circuit are electrically connected to two terminals of the second energy storage circuit, two terminals of the first energy storage circuit are connected to an output terminal of the DC voltage source; and
when the auxiliary circuit is coupled to the main circuit, the auxiliary circuit charges the second energy storage circuit, and energy stored in the second energy storage circuit is then transmitted to a load via the main circuit.

19. The method according to claim 18, wherein the step of coupling the auxiliary circuit to the main circuit includes coupling the auxiliary circuit to an input terminal of the main circuit.

20. The method according to claim 18, wherein the main circuit includes a half bridge LLC circuit.

21. The method according to claim 18, wherein the auxiliary circuit includes an auxiliary transformer and an auxiliary switch.

22. The method according to claim 21, wherein when the auxiliary switch is turned on and off at a certain frequency, the auxiliary circuit is coupled to the main circuit, and when the auxiliary switch is turned off, the auxiliary circuit is not coupled to the main circuit.

23. The method according to claim 18, wherein the DC-DC converting apparatus includes a switch which is connected in parallel with the second energy storage circuit, the method further comprising turning on the switch when the input voltage does not exceed the predetermined range.

24. The method according to claim 23, further comprising a step of:
using a controller to control charging or discharging of the second energy storage circuit by the main circuit and the auxiliary circuit; wherein
when the controller is used to control the auxiliary circuit to charge the second energy storage circuit, the main circuit does not discharge the second energy storage circuit, or when the controller is used to control the auxiliary circuit to charge the second energy storage circuit, the main circuit does not charge the second energy storage circuit.

25. A method of controlling a DC-DC converting apparatus to output a constant voltage, the DC-DC converting apparatus including a main circuit and an auxiliary circuit, the method comprising the steps of:
detecting an input voltage;
determining whether the detected input voltage is in a predetermined range; and
if the detected input voltage is in the predetermined range, coupling the auxiliary circuit to the main circuit by controlling a switch, wherein
the DC-DC converting apparatus includes a first energy storage circuit and a second energy storage circuit, the first energy storage circuit is connected in series to the second energy storage circuit, two output terminals of the auxiliary circuit are electrically connected to two terminals of the second energy storage circuit, two terminals of the first energy storage circuit are connected to an output terminal of the main circuit; and
when the auxiliary circuit is coupled to the main circuit, the second energy storage circuit provides an additional supplementary voltage to an output terminal of a load.

26. The method according to claim 25, wherein the step of coupling the auxiliary circuit to the main circuit includes coupling the auxiliary circuit to an output terminal of the main circuit.

27. The method according to claim 25, wherein the main circuit includes a half bridge LLC circuit.

28. The method according to claim 25, wherein the auxiliary circuit includes an auxiliary transformer and an auxiliary switch.

29. The method according to claim 28, wherein when the auxiliary switch is turned on and off at a certain frequency, the auxiliary circuit is coupled to the main circuit, and when the auxiliary switch is turned off, the auxiliary circuit is not coupled to the main circuit.

30. The method according to claim 25, wherein the DC-DC converting apparatus includes a switch which is connected in parallel with the second energy storage circuit, the method further comprising turning on the switch when the input voltage does not exceed the predetermined range.

31. The method according to claim 30, further comprising a step of:
   using a controller to control charging or discharging of the second energy storage circuit by the main circuit and the auxiliary circuit; wherein
   when the controller is used to control the auxiliary circuit to charge the second energy storage circuit, the main circuit does not discharge the second energy storage circuit, or when the controller is used to control the auxiliary circuit to charge the second energy storage circuit, the main circuit does not charge the second energy storage circuit.

* * * * *